United States Patent
Fera et al.

(10) Patent No.: US 6,650,949 B1
(45) Date of Patent: Nov. 18, 2003

(54) METHOD AND SYSTEM FOR SORTING INCIDENT LOG DATA FROM A PLURALITY OF MACHINES

(75) Inventors: Gregory J. Fera, Erie, PA (US); Christopher M. McQuown, Erie, PA (US); Bryan S. Reichenbach, Erie, PA (US); Edward P. Wisniewski, Erie, PA (US)

(73) Assignee: General Electric Company, Erie, PA (US)

( * ) Notice: Subject to any disclaimer, the term of this patent is extended or adjusted under 35 U.S.C. 154(b) by 0 days.

(21) Appl. No.: 09/521,328

(22) Filed: Mar. 9, 2000

Related U.S. Application Data

(60) Provisional application No. 60/173,948, filed on Dec. 30, 1999.

(51) Int. Cl.[7] .............................. G05B 9/02; G06F 11/30
(52) U.S. Cl. .............................. 700/79; 714/25; 714/26; 714/48; 702/183
(58) Field of Search .......................... 700/79, 21, 174; 714/48, 47, 25, 26; 702/182–185; 706/47

(56) References Cited

U.S. PATENT DOCUMENTS

| | | | |
|---|---|---|---|
| 4,985,857 A | * 1/1991 | Bajpai et al. | 364/551.01 |
| 5,133,046 A | 7/1992 | Kaplan | 395/61 |
| 5,347,449 A | * 9/1994 | Meyer et al. | 364/185 |
| 5,463,768 A | 10/1995 | Cuddihy et al. | 395/183.13 |
| 5,586,066 A | 12/1996 | White et al. | 364/576 |
| 6,243,628 B1 | 6/2001 | Bliley et al. | 701/29 |
| 6,301,531 B1 | 10/2001 | Pierro et al. | 701/29 |
| 6,324,659 B1 | * 11/2001 | Pierro | 714/48 |
| 6,336,065 B1 | 1/2002 | Gibson et al. | 701/29 |
| 6,338,152 B1 | * 1/2002 | Fera et al. | 714/48 |
| 6,343,236 B1 | 1/2002 | Gibson et al. | 700/79 |
| 6,415,395 B1 | * 7/2002 | Varma et al. | 714/37 |

FOREIGN PATENT DOCUMENTS

| | | |
|---|---|---|
| EP | 0 658 833 A | 6/1995 |
| WO | WO 90 16048 A | 12/1990 |

* cited by examiner

*Primary Examiner*—Paul P. Gordon
(74) *Attorney, Agent, or Firm*—Carl Rowold, Esq.; Enrique J. Mora, Esq.; Beusse, Brownlee, Bowdoin & Wolter, PA

(57) ABSTRACT

A method for sorting respective incident log data from a plurality of machines undergoing diagnostics is provided. The method allows for receiving incident log data comprising one or more incidents from the plurality of machines and for receiving operational parameter data from the plurality of machines. The method further allows for executing a set of incident-authentication rules indicative of whether a received incident actually corresponds to a faulty condition or not. An assigning step allows for assigning a predetermined incident severity rating to the respective incidents, and a processing step allows for processing the respective incidents based on their respective incident severity rating.

65 Claims, 5 Drawing Sheets

FIG. 2

| CUST | UNIT | DATE | CODE | DESC | DESC1 | FAILMODE_DESC | SUB_ASSEMBLY_CODE | MAIN_ASSEMBLY_CODE |
|---|---|---|---|---|---|---|---|---|
| RR | 3500 | Sun Jul 13 1997 | 1111 | Piping Fittings-Engine Intercooler | REPAIRED WATER LEAK AT TOP OF RT | LEAKING FLUIDAIR | ENGINTCOOL | ENGINE |
| RR | 3500 | Tue Jul 01 1997 | 2222 | Lube Oil - Engine | WATER IN LUB OIL CHANGED OIL | CONTAMINATED | LUBEOIL | ENGISUPT |
| RR | 3500 | Sat Jun 28 1997 | 3333 | BRP-Battery Charger Regulator Panel | NO BATCHARGE-REPL BRP | UNKNOWNUNDETERMIN | POWERPANEL | POWERELN |
| RR | 3500 | Wed Jun 18 1997 | 4444 | EFI-High Pressure Pump | REPLACE 3 HP PUMPS FOR NOT FIRING | UNKNOWNUNDETERMIN | ENGFUELINJ | ENGINE |
| RR | 3500 | Mon Jun 09 1997 | 5555 | Turbocharger Assembly- General-Eng | TURBO DRAFSSECONDARY DAMAGE-RPL | UNKNOWNUNDETERMIN | ENGTURBO | ENGINE |
| RR | 3500 | Sat May 24 1997 | 6666 | Cylinder Assembly-General-Eng | REPL R6 PA FOR SECONDARY DAMAGE | UNKNOWNUNDETERMIN | POWERASSY | ENGINE |
| RR | 3500 | Sat May 24 1997 | 7777 | Cylinder Assembly-General-Eng | TRIPPING COP PISTON FAILURE CO | UNKNOWNUNDETERMIN | POWERASSY | ENGINE |

FIG. 3

```
RR  3500  03-may-1997  1000  90623.06 90637.20  0.0 C S 0 1 2 0 101  97 R E O O _____ Intake Manifold Air Too
RR  3500  03-may-1997  2000  90623.06 90637.20  0.0 C S 0 1 2 0 101  97 R E O O _____ Intake Manifold Air Too
RR  3500  22-may-1997  3000  91067.93 90167.93  11.4 F 5 992 288 4706 202 177 182 M E F O  6 AB_M_S____ COP Trip
RR  3500  22-may-1997  4000  91067.93 91067.93  11.4 F 5 992 288 4706 202 177 182 M E F O  6 AB_M_S____ COP Trip
RR  3500  22-may-1997  5000  91068.70 91068.71  16.5 F 4 885 338 2864 133 175 186 M E 2 4  6 AB_M_S____ COP Trip
RR  3500  22-may-1997  6000  91068.70 91068.71  16.5 F 4 885 338 2864 133 175 186 M E 2 4  6 AB_M_S____ COP Trip
RR  3500  22-may-1997  7000  91068.71   0.00  17.9 F1 458  6  0 0174 186 R E F 4 E AB _____ Fault Reset While In Le
RR  3500  22-may-1997  8000  91068.71   0.00  17.9 F1 458  6  0 0174 186 R E F 4 E AB _____ Fault Reset While In Le
RR  3500  22-may-1997  9000  91069.55 91069.55  23.1 F 5 992 474 3005 148 180 187 M E 2 O R 6 AB_M_S____ COP Trip
RR  3500  22-may-1997  1111  91069.55 91069.55  23.1 F 5 992 474 3005 148 180 187 M E 2 O R 6 AB_M_S____ COP Trip
RR  3500  22-may-1997  2222  91069.56 91069.58  27.4 F 6 1010 506 2405 128 179 189 M E F 4  6 AB_M_S____ COP Trip
```

METHOD AND SYSTEM FOR SORTING INCIDENT LOG DATA FROM A PLURALITY OF MACHINES

This application claims the benefit of provisional application Ser. No. 60/173,948 filed Dec. 30, 1999.

BACKGROUND OF THE INVENTION

The present invention relates generally to machine diagnostics, and more specifically, to a system and method for sorting machine data, e.g., operational parameter data and incident log data to facilitate analysis of one or more machines undergoing diagnostics.

A machine, such as a locomotive or other complex systems used in industrial processes, medical imaging, telecommunications, aerospace applications, power generation, etc., includes elaborate controls and sensors that generate faults when anomalous operating conditions of the machine are encountered. Typically, a field engineer will look at a fault log and determine whether a repair is necessary.

Approaches like neural networks, decision trees, etc., have been employed to learn over input data to provide prediction, classification, and function approximation capabilities in the context of diagnostics. Often, such approaches have required structured and relatively static and complete input data sets for learning, and have produced models that resist real-world interpretation.

Another approach, Case Based Reasoning (CBR), is based on the observation that experiential knowledge (memory of past experiences-or cases) is applicable to problem solving as learning rules or behaviors. CBR relies on relatively little pre-processing of raw knowledge, focusing instead on indexing, retrieval, reuse, and archival of cases. In the diagnostic context, a case refers to a problem/solution description pair that represents a diagnosis of a problem and an appropriate repair.

CBR assumes cases described by a fixed, known number of descriptive attributes. Conventional CBR systems assume a corpus of fully valid or "gold standard" cases that new incoming cases can be matched against.

U.S. Pat. No. 5,463,768 discloses an approach which uses error log data and assumes predefined cases with each case associating an input error log to a verified, unique diagnosis of a problem. In particular, a plurality of historical error logs are grouped into case sets of common malfunctions. From the group of case sets, common patterns, i.e., consecutive rows or strings of data, are labeled as a block. Blocks are used to characterize fault contribution for new error logs that are received in a diagnostic unit. Unfortunately, for a continuous fault code stream where any or all possible fault codes may occur from zero to any finite number of times and where the fault codes may occur in any order, predefining the structure of a case is nearly impossible.

U.S. Pat. No. 6,343,236, assigned to the same assignee of the present invention and herein incorporated by reference, discloses a system and method for processing historical repair data and fault log data, which is not restricted to sequential occurrences of fault log entries and which provides weighted repair and distinct fault cluster combinations, to facilitate analysis of new fault log data from a malfunctioning machine. Further, U.S. Pat. No. 6,415,395, assigned to the same assignee of the present invention and herein incorporated by reference, discloses a system and method for analyzing new fault log data from a malfunctioning machine in which the system and method are not restricted to sequential occurrences of fault log entries, and wherein the system and method predict one or more repair actions using predetermined weighted repair and distinct fault cluster combinations.

It is believed that the diagnostic tools disclosed in the foregoing patent applications provide substantial advantages and advancements in the art of diagnostics. It would be desirable, however, to provide a system and method that allows for sorting the incident log data based on the severity of the incident so that incidents likely to result in a mission failure, e.g., a road failure in the case of a locomotive, are prioritized over incidents not likely to affect machine operation, at least for a predetermined period of time. It would be further desirable, through the use of incident-authentication rules, to substantially eliminate nuisance incidents, e.g., incidents containing unreliable or useless information that may be present in the incident log data and/or the operational parameter data. This sorting or triage process would advantageously allow for increasing the probability of early detection of actual incipient failures in the machine, as well as decreasing the probability of falsely declaring non-existent failures. Further, such incident-authentication rules would prevent feeding the nuisance incidents into the diagnostic tools and would thus further enhance the predictive accuracy of the diagnostic algorithms used therein while conserving the processing power consumed by the diagnostic algorithms.

BRIEF SUMMARY OF THE INVENTION

Generally speaking, one embodiment of the present invention fulfills the foregoing needs by providing a method for sorting respective incident log data from a plurality of machines undergoing diagnostics. The method allows for receiving incident log data comprising one or more incidents from the plurality of machines. The method further allows for assigning a predetermined incident severity rating to the respective incidents and for processing the respective incidents based on their respective incident severity rating.

Another embodiment of the present invention further fulfills the foregoing needs by providing a method for sorting respective incident log data from a plurality of machines undergoing diagnostics. The method allows for receiving incident log data comprising one or more incidents from the plurality of machines and for receiving operational parameter data from the plurality of machines. The method further allows for executing a set of incident-authentication rules indicative of whether a received incident actually corresponds to a faulty condition or not. An assigning step allows for assigning a predetermined incident severity rating to the respective incidents, and a processing step allows for processing the respective incidents based on their respective incident severity rating.

The present invention further provides a system for sorting respective incident log data from a plurality of machines undergoing diagnostics. The system includes means for receiving incident log data comprising one or more incidents from the plurality of machines. The system further includes means for assigning a predetermined incident severity rating to the respective incidents, and means for processing the respective incidents based on their respective incident severity rating.

BRIEF DESCRIPTION OF THE DRAWINGS

The features and advantages of the present invention will become apparent from the following detailed description of the invention when read with the accompanying drawings in which:

FIG. 2 is an illustration of a portion of exemplary repair log data;

FIG. 3 is an illustration of a portion of exemplary machine data, e.g., incident log data, operational parameter data, etc.

DETAILED DESCRIPTION OF THE INVENTION

Figure 1:
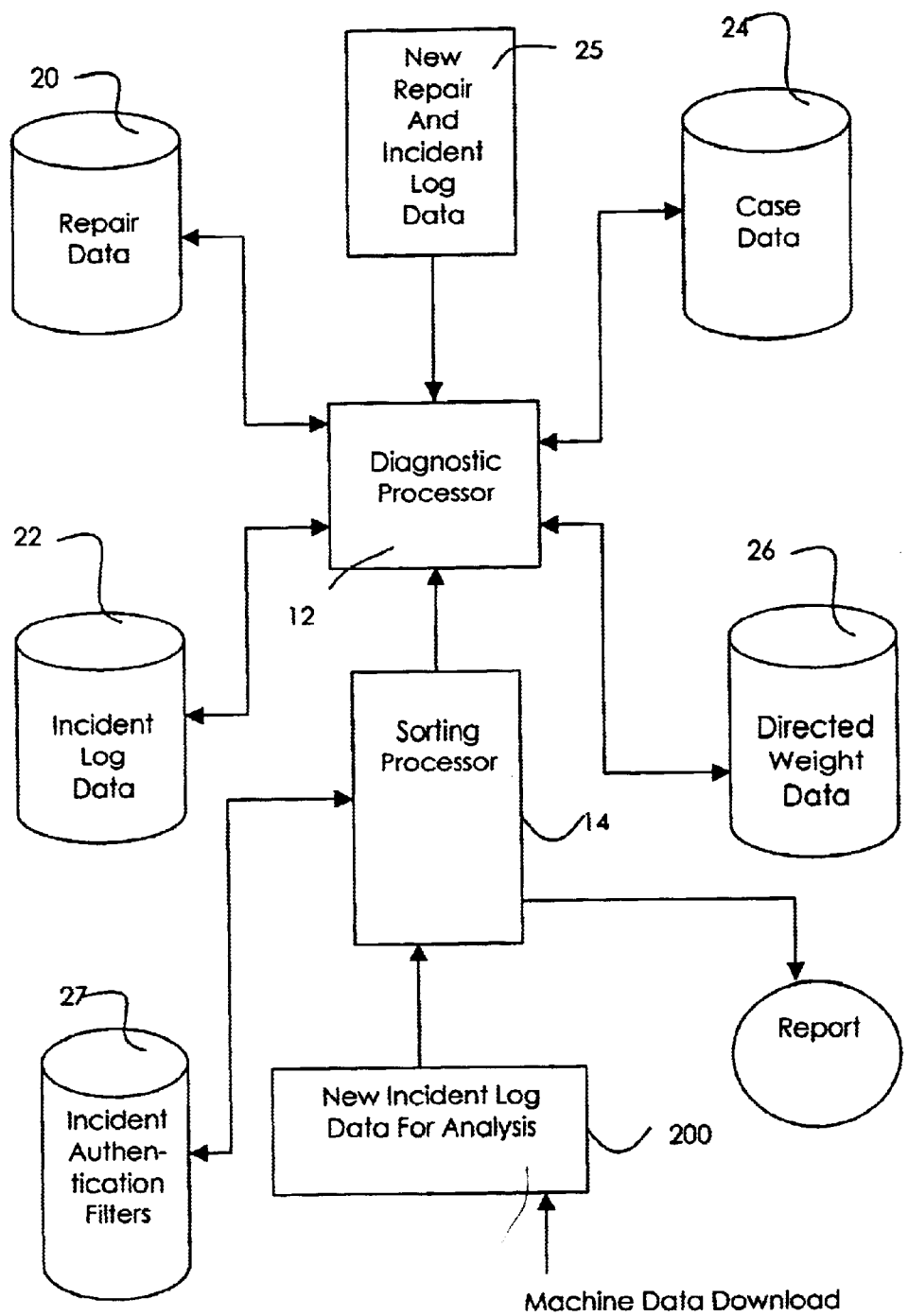
FIG. 1 is a block diagram schematic of an exemplary diagnostic system that may be coupled to receive incident log data from a triage or sorting processor embodying the present invention.

FIG. 1 diagrammatically illustrates one exemplary diagnostic system 10 that may benefit from the techniques of the present invention. System 10 provides a process for automatically harvesting or mining repair data comprising a plurality of related and unrelated repairs and incident log data comprising a plurality of incidents, from one or more machines such as locomotives, and generating weighted repair and distinct incident cluster combinations which are diagnostically significant predictors to facilitate analysis of new incident log data from a malfunctioning locomotive. As used herein incident log data refers to machine log data that may comprise fault-type indications of an impending malfunction in one or more subsystems of the locomotive, and may further comprise non-critical informational-type indications that may not require any corrective action and may be useful to corroborate the health status of one or more of the subsystems of the machine.

Although the present invention is described with reference to a locomotive, the techniques of the present invention can be used in conjunction with any machine in which operation of the machine is monitored, such as a chemical, an electronic, a mechanical, or a microprocessor machine.

Exemplary system 10 includes a diagnostic processor 12 such as a computer (e.g., UNIX workstation) having a hard drive, input devices such as a keyboard, a mouse, magnetic storage media (e.g., tape cartridges or disks), optical storage media (e.g., CD-ROMs), and output devices such as a display and a printer. Processor 12 is operably connected to and processes data contained in a repair data storage unit 20 and an incident log data storage unit 22. In one aspect of this invention processor 12 is further respectively connected to a sorting or triage processor 14 that executes incident-authentication filters stored in a storage unit.

Repair data storage unit 20 includes repair data or records regarding a plurality of related and unrelated repairs for one or more locomotives. FIG. 2 shows an exemplary portion 30 of the repair data contained in repair data storage unit 20. The repair data may include a customer identification number 32, a locomotive identification or unit number 33, the date 34 of the repair, the repair code 35, a repair code description 36, a description of the actual repair 37 performed, etc.

Incident log data storage unit 22 includes incident log data or records regarding a plurality of incidents occurring prior to the repairs for the one or more locomotives. FIG. 3 shows an exemplary portion 40 of the incident log data contained in incident log data storage unit 22. The incident log data may include a customer identification number 42, a locomotive identification number or unit 44, the date 45 when the incident occurred, an incident code 46, an incident code description 48, etc.

As suggested above, additional data used in the present invention include operational parameter data indicative of a plurality of operational parameters or operational conditions of the machine. The operational parameter data may be obtained from various sensor readings or observations, e.g., temperature sensor readings, pressure sensor readings, electrical sensor readings, engine power readings, etc. Examples of operational conditions of the machine may include whether the locomotive is operating in a motoring or in a dynamic braking mode of operation, whether any given subsystem in the locomotive is undergoing a self-test, whether the locomotive is stationary, whether the engine is operating under maximum load conditions, etc. It will be appreciated by those skilled in the art that the repair data storage unit, the incident log data storage unit, and the operational parameter data storage unit may respectively contain repair data, incident log data and operational parameter data for a plurality of different locomotives, individually locomotive models that may be distinctly configured relative to one another, such as may occur when a new model introduces new sub-systems or sub-system upgrades into the locomotive. It will be further appreciated that the operational parameter data may be made up of snapshot observations, i.e., substantially instantaneous readings or discrete samples of the respective values of the operational parameters from the locomotive. Preferably, the snapshot observations are temporally aligned relative to the time when respective incidents are generated or logged in the locomotive. For example, the temporal alignment allows for determining the respective values of the operational parameters from the locomotive prior, during or after the logging of respective incidents in the locomotive. The operational parameter data need not be limited to snapshot observations since substantially continuous observations over a predetermined period of time before or after an incident is logged can be similarly obtained. This feature may be particularly desirable if the system is configured for detection of trends that may be indicative of incipient failures in the locomotive.

Figure 4:
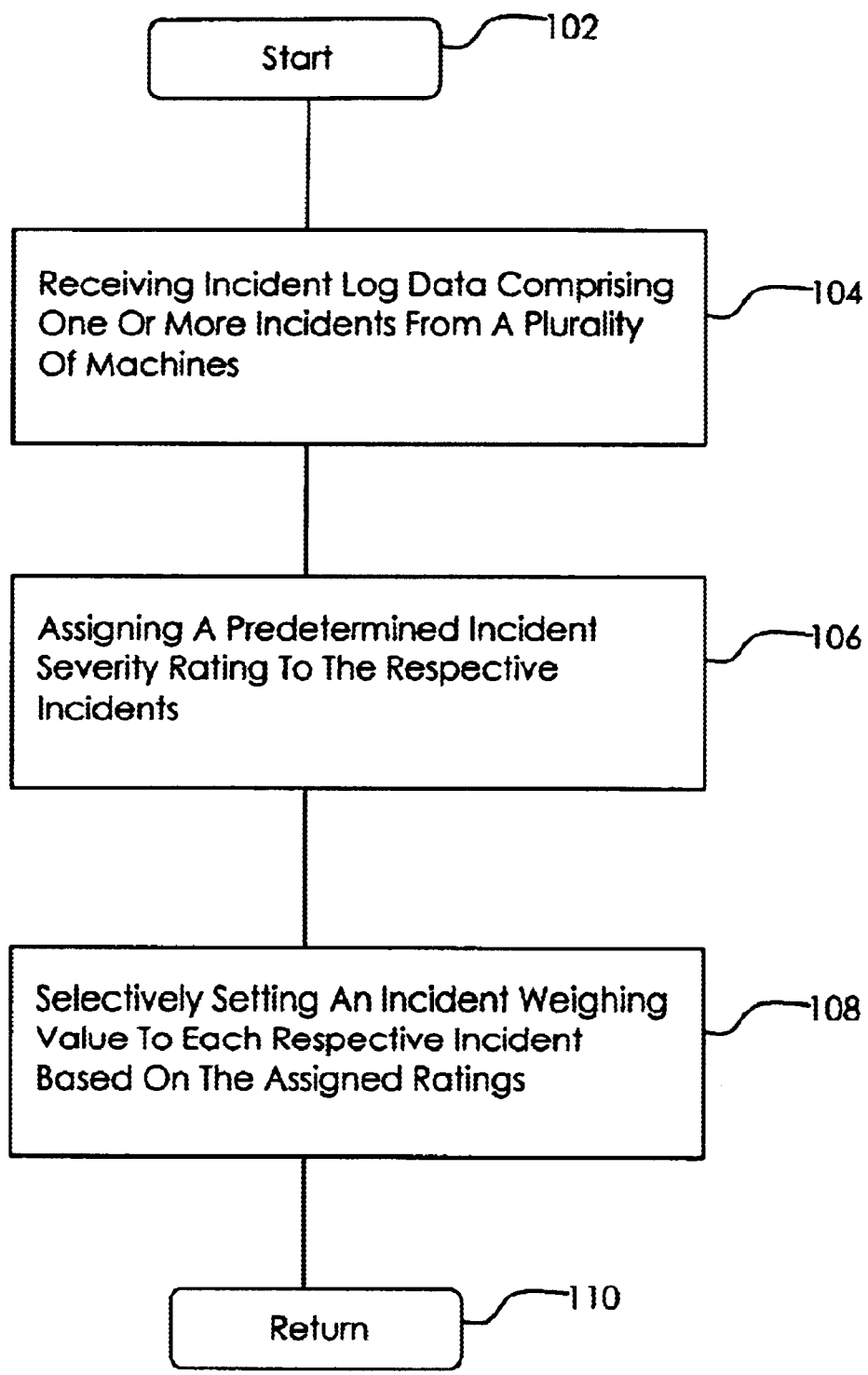
FIG. 4 is a flow chart of one exemplary embodiment of the sorting process of the present invention.

FIG. 4 shows an algorithm of the triage or sorting process of the present invention. Subsequent to start step 102, step 104 allows for receiving incident log data comprising one or more incidents from a plurality of machines. Step 106 allows for assigning a predetermined incident severity rating to the respective incidents. By way of example and not of limitation, the incident rating may be classified as red (R), yellow (Y) or green (G). It will be appreciated, however, that one may choose to use more or less than three classifications of the incident severity rating. Table 1 below shows definitions of the above incident log rating classifications.

TABLE 1

Exemplary Incident Severity Ratings

| Incident Severity Rating | description |
| --- | --- |
| red | a critical or severe incident likely to cause a road failure if not immediately addressed. |
| yellow | a moderate incident requireing further investigation and/or action, but unlikely to cause a road failure if not immediately addressed. |
| green | a non-critical, informational-type incident usually requiring no further investigation or action. |

Prior to return step 110, step 108 allows for selectively setting an incident weighing value to each respective incident based on the assigned incident severity rating. For example, if the incident is classified as a green incident, then the incident weighing value of that incident may be lower compared to the incident weighing value of incidents classified as red incidents. Similarly, an incident which is classified as a yellow incident may be assigned an incident weighing value which is intermediate between the red and the green incident weighing values.

Figure 5:
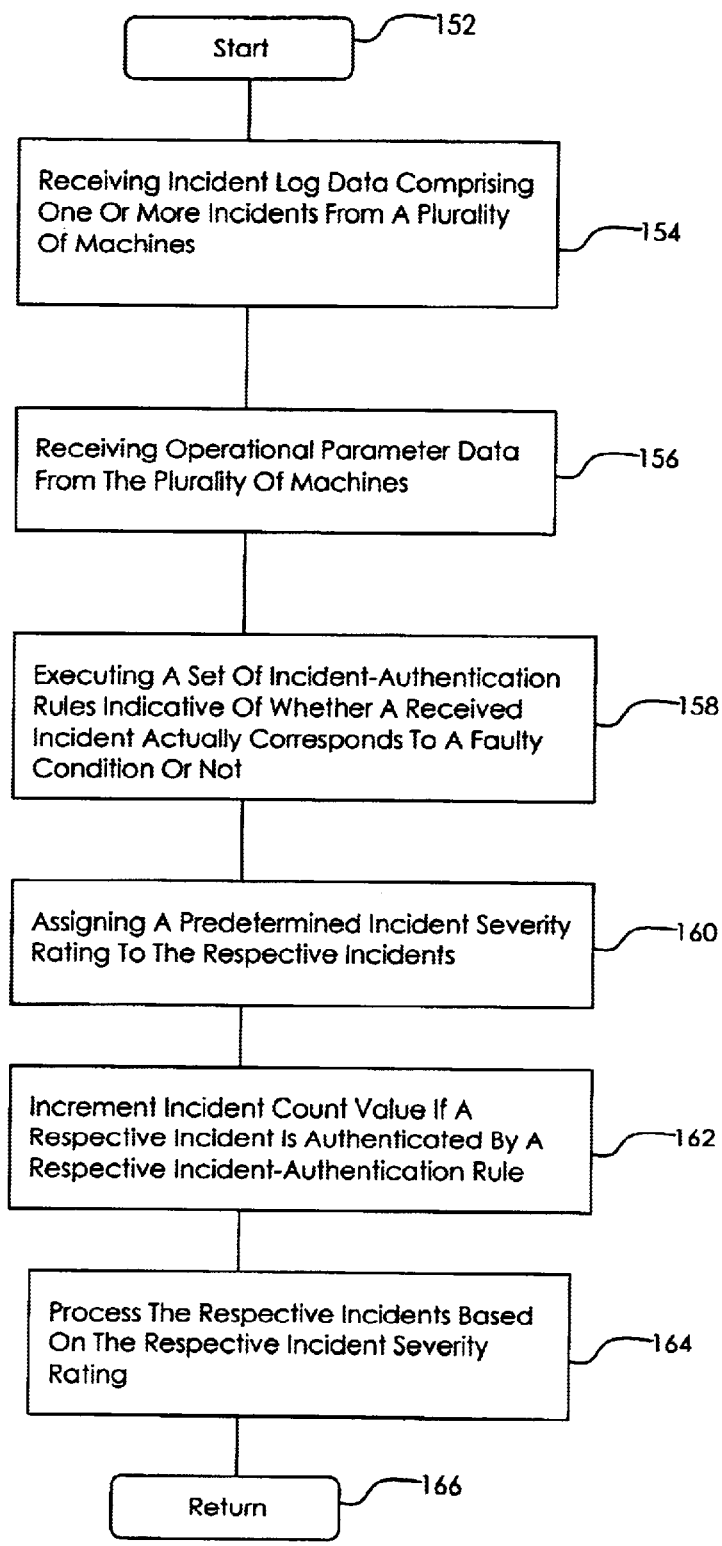
FIG. 5 is a flow chart of another exemplary embodiment of the sorting process of the present invention.

FIG. 5 shows another algorithm in accordance with another embodiment of the present invention. Subsequent to start step 152, step 154 allows for receiving incident log data comprising one or more incidents from a plurality of machines. Step 156 allows for receiving operational parameter data from the plurality of machines. Step 158 allows for executing a set of incident-authentication rules or filters indicative of whether a received incident actually corresponds to a faulty condition or not.

Figure 6:
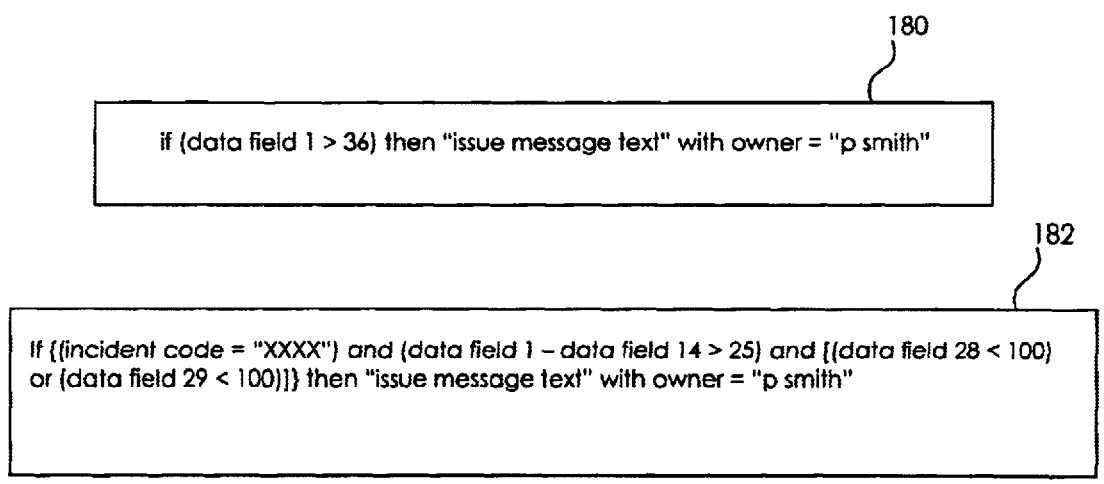
FIG. 6 shows exemplary incident-authentication rules.

Exemplary incident-authentication rules may be seen in FIG. 6. As shown in block 180, an incident-authentication rule may be a function of one or more data fields, e.g., operational parameters, and, if desired, an incident code or combinations thereof. In block 180, data field 1 represents a particular operational parameter from a data record, and a respective conditional logic operator is applied to the operational parameter being processed. The issue message text is a data field that contains a message describing the condition identified when the incident-authentication rule is triggered, e.g., water temperature sensor may be bad. "P. Smith" represents a data field indicative of the owner or individual assigned to resolve issues associated with a respective subsystem of the machine. It will be appreciated by those skilled in the art that more complex incident-authentication rules are possible. An example of a more complex rule is exemplified in block 182 in FIG. 6. The incident-authentication rule of block 182, in addition to executing logical or mathematical functions on the four identified operational parameters, e.g., data fields 1, 14, 28 and 29, identifies a given incident code, e.g., incident code XXXX, that must occur in order for the incident authentication rule to be triggered. It will be appreciated that the format used in blocks 180 and 182 are merely exemplary since many other formats can be applied to implement the present invention. It will be appreciated that one could define even more complex incident-authentication rules than the ones exemplified in blocks 180 and 182 by using multiple combinations of logical and/or relational operators. It will be further appreciated that the authentication rules can be nested to incorporate temporal information, that is, time-related information relative to the occurrence of temporally distinct incidents. For example, such nested rules may be set to be triggered depending on the magnitude of the level of change in one or more operational parameters relative to recent incidents, such as the two most recent incidents, etc. Similarly, such nested rules could be triggered based on the number of previous incident occurrences over a predetermined period of time, such as whether a given incident has occurred a predetermined number of times over the last month, week, day, etc. It will be apparent that the incident occurrences for triggering such nested rules need not be limited to single incidents since, as suggested above, respective cluster combinations of distinct incidents could be used for triggering the authentication rules. To distinguish one incident-authentication rule from another, each rule may be assigned a respective code identifier of the form TXX, where XX represents a unique alpha numeric combination. Examples of identifiers may be T03 and TF4. As with the incident code format, one may choose any suitable identifier format as long as the chosen identifier format allows for defining a unique identifier for each incident-authentication rule.

Returning to FIG. 5, step 160 allows for assigning a predetermined incident severity rating to the respective incidents. At step 162, as suggested an incident count value may be incremented if the incident has been authenticated by a respective incident authentication rule. It will be appreciated that there may be conditions in the operational parameters of the machine that can allow for disregarding some incident log data. One example of an incident-disregarding condition may occur when the value of the operational parameter corresponding to locomotive speeds is zero. In this manner, depending on whether the locomotive is moving or not, one can weigh the incident log data accordingly. It will be appreciated that the incident count value need not be incremented only for red or yellow incident categories since any of the categories may be selected to be counted. For example, one could choose to increment the incident count value just for red incidents, while ignoring all of the yellow and green incidents. In the foregoing example, the condition of locomotive speed being greater than zero is a criteria that can be selectively applied to a subset of incident log data or to all downloaded incident log data. Prior to return step 166, step 164 allows for processing the respective incidents based on the respective incident severity rating.

Below is one illustrative example of the sorting process of the present invention. Given the following data log record:

Mon, Jan. 18, 1999, 23:45:34, 987698563, 10-1305, "Water Temperature>230 Degrees", 22.45, 8, 23.6, . . . ;

Given the incident severity ratings listed on Table 2 below and further given the following incident rules:

Rule T01: if {(incident code="10-1305") and (speed>0) and (water pressure<25)} then "Coolant Level May Be Low" with owner="h jones"

Rule T02: if {(speed>0) and (throttle notch=8) and (water pressure>=25)} then "Water Temperature Sensor May Be Bad" with owner="j doe"

TABLE 2

| Incident Code | Severity Rating (R = red, Y = yellow, G = green) | Owner | Additional Criteria |
|---|---|---|---|
| . . . | . . . | . . . | . . . |
| 10-1304 | R | b mkcoy | speed > 0 |
| 10-1305 | Y | p smith | speed > 0 |
| 10-1306 | Y | h jones | speed > 0 |
| . . . | . . . | . . . | . . . |

Based of the foregoing assumptions, then the process of the present invention would allow for parsing the data log record into its various data fields. For example, in the exemplary data log record listed above, the occurrence time of the incident is Monday, Jan. 18, 1999, 23:45:34, which can be formatted to be displayed in seconds so as to result in a trigger time of 987698563, the exemplary incident code is 10-1305, the incident description is "water temperature larger than 230 degrees", operational parameter one (e.g., locomotive speed) equals 22.45 MPH, operational parameter two (e.g., throttle notch ) equals 8 units. Operational parameter three (e.g., water pressure) equals 23.6 pressure units. As suggested above, the process of the present invention would allow for looking up or assigning the incident severity rating and for determining the owner and any other additional criteria associated with the incident. In this example, because the incident code severity rating of incident code 10-1305 is yellow and the value of the locomotive speed was greater than zero when the incident occurred, then the incident count value for incident code 10-1305 is incremented by one. The process would then allow for executing the incident-authentication rules against the record fields. Since the incident codes is 10-1305 and the locomotive speed value is greater than zero and the water pressure is less than 25, rule T01 would be triggered so as to indicate a true condition and as a result the count for rule T01 is incremented by one. In addition because rule T01 was triggered to authenticate incident 10-1305, then, P Smith, the designated individual would be automatically notified via E-mail or any other suitable means of communication, pager signal, telephone, Internet, etc. In addition, since incident code 10-1305 was authenticated by rule T01, such incident could now be inputted into the diagnostic tools for CBR analysis and the like. In the case of rule T02, the locomotive speed value is greater than zero but the water pressure is not greater than or equal to 25, therefore rule T02 would not be triggered and would not authenticate a true incident condition for incident 10-1305 and, in this case, the incident count value for rule T02 would not be incremental. As suggested above, the process of the present invention allows for reporting authenticated occurrences of critical incidents, triggering true incident conditions, and their respective count values. In this case, no report would be made to "j doe" since rule TO2 was not triggered and thus no authentication of a condition indicative of a possible bad water temperature sensor was made. At this point, such condition may be optionally disregarded and not be inputted into the diagnostic tool.

Exemplary report messages for the above example could be as follows:

10-1305 "Water Temperature Exceeded 230 Degrees" (1) p smith; and

T01—"Coolant Level May Be Low" (1) h jones;

where a first data field could contain the applicable incident code or rule, e.g., 10-1305, or rule T01; a second field could contain the incident description or incident rule message, e.g., "Water Temperature Exceeded 230 Degrees" or "Coolant Level may be Low"; a third field may contain the incident weighing value, e.g., 1; and the last data field in this example could includes the name of the individual, e.g., "p smith" or "h jones" assigned to be responsible for the subsystem affected by the incident code or responsible for the incident rule associated with that incident code.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A method for sorting respective incident log data from a plurality of machines undergoing diagnostics, the method comprising:

receiving incident log data comprising one or more incidents from the plurality of machines;

assigning a predetermined incident severity rating to the respective incidents;

selectively setting a incident weighing value for each respective incident based on its assigned rating; and processing the respective incidents based on their respective incident severity rating.

2. A method for sorting respective incident log data from a plurality of machines undergoing diagnostics, the method comprising:

receiving incident log data comprising one or more incidents from the plurality of machines;

receiving operational parameter data from the plurality of machines;

assigning a predetermined incident severity rating to the respective incidents;

executing a set of incident-authentication rules indicative of whether a received incident actually corresponds to a faulty condition or not;

defining an incident count value for each respective incident based on its assigned rating; and processing the respective incidents based on their respective incident severity rating.

3. A method for sorting respective incident log data from a plurality of machines undergoing diagnostics, the method comprising:

receiving incident log data comprising one or more incidents from the plurality of machines;

receiving operational parameter data from the plurality of machines;

assigning a predetermined incident severity rating to the respective incidents;

executing a set of incident-authentication rules indicative of whether a received incident actually corresponds to a faulty condition or not;

defining an incident count value for each respective incident based on its assigned rating;

adjusting the incident count value based on whether an incident-authentication rule is triggered or not; and processing the respective incidents based on their respective incident severity rating.

4. A method for sorting respective incident log data from a plurality of machines undergoing diagnostics, the method comprising:

receiving incident log data comprising one or more incidents from the plurality of machines;

assigning a predetermined incident severity rating to the respective incidents, wherein the incident severity rating is based on an expected level of machine degradation associated with each respective incident; and processing the respective incidents based on their respective incident severity rating.

5. The method of claim 4 wherein the expected level of machine degradation comprises an imminent machine mission failure.

6. The method of claim 4 wherein the expected level of machine degradation is undeterminable.

7. The method of claim 6 further comprising a step of executing expert analysis when the expected level of machine degradation is classified as undeterminable.

8. The method of claim 4 wherein the expected level of machine degradation is sufficiently low to enable continuing operation of the machine at least for a predetermined time interval.

9. The method of claim 4 further comprising a step of storing any incidents indicative of imminent mission failures in a database of critical incidents.

10. The method of claim 4 wherein the received incident log data comprises incident log data of respective subsystems of the plurality of machines.

11. The method of claim 10 further comprising a step of providing an electronic database designating one or more individuals responsible for respective ones of the machine subsystems.

12. The method of claim 11 further comprising a step of electronically notifying the designated individuals of subsystem incidents classified as likely to result in respective road failures.

13. The method of claim 11 further comprising a step of electronically notifying the designated individuals of subsystem incidents classified as undeterminable and/or special interest.

14. A method for sorting respective incident log data from a plurality of machines undergoing diagnostics, the method comprising:
receiving incident log data comprising one or more incidents from the plurality of machines, wherein the plurality of machines comprises a fleet of locomotives;
assigning a predetermined incident severity rating to the respective incidents; and
processing the respective incidents based on their respective incident severity rating.

15. The method of claim 14 wherein the expected level of machine degradation comprises an imminent road failure.

16. A method for sorting respective incident log data from a plurality of machines undergoing diagnostics, the method comprising:
receiving incident log data comprising one or more incidents from the plurality of machines;
receiving operational parameter data from the plurality of machines, wherein the operational parameter data comprises snapshot data;
assigning a predetermined incident severity rating to the respective incidents; and
processing the respective incidents based on their respective incident severity rating.

17. A method for sorting respective incident log data from a plurality of machines undergoing diagnostics, the method comprising:
receiving incident log data comprising one or more incidents from the plurality of machines;
receiving operational parameter data from the plurality of machines;
executing a set of incident-authentication rules indicative of whether a received incident actually corresponds to a faulty condition or not;
assigning a predetermined incident severity rating to the respective incidents; and
processing the respective incidents based on their respective incident severity rating.

18. The method of claim 17 wherein the incident log data and/or operational data is programmed based on a respective configuration of respective ones of the machines.

19. The method of claim 17 wherein each respective one of the incident-authentication rules is triggered upon detection of a respective combination of operational parameters from the machine.

20. The method of claim 17 wherein each respective one of the incident-authentication rules is triggered upon detection of a respective combination of incidents from the machine.

21. The method of claim 17 wherein each respective one of the incident-authentication rules is triggered upon detection of a respective combination of incidents and operational parameters from the machine.

22. The method of claim 17 further comprising a step of disregarding incidents authenticated as corresponding to non-faulty conditions.

23. The method of claim 17 further comprising a step of selectively setting a incident weighing value for each respective incident based on its assigned rating.

24. The method of claim 23 further comprising a step of defining an incident count value based on whether an incident-authentication rule is triggered or not.

25. The method of claim 17 wherein the incident severity rating is based on an expected level of machine degradation associated with each respective incident.

26. The method of claim 25 wherein the expected level of machine degradation comprises an imminent machine mission failure.

27. The method of claim 25 wherein the expected level of machine degradation is sufficiently low to enable continuing operation of the machine at least for a predetermined time interval.

28. The method of claim 17 wherein the operational parameter data comprises snapshot data.

29. The method of claim 17 wherein the plurality of machines comprises a fleet of locomotives.

30. The method of claim 29 wherein the expected level of machine degradation comprises an imminent road failure.

31. The method of claim 17 wherein the expected level of machine degradation is undeterminable.

32. The method of claim 31 further comprising a step of executing expert analysis when the expected level of machine degradation is classified as undeterminable and/or of special interest.

33. The method of claim 17 wherein the received incident log data comprises incident log data of respective subsystems of the plurality of machines.

34. The method of claim 33 further comprising a step of providing an electronic database designating one or more individuals responsible for respective ones of the machine subsystems.

35. The method of claim 34 further comprising a step of electronically notifying the designated individuals of subsystem incidents classified as likely to result in respective road failures.

36. The method of claim 34 further comprising a step of electronically notifying the designated individuals of subsystem incidents classified as undeterminable and/or of special interest.

37. An article of manufacture comprising:
a computer program product comprising a computer-usable medium having a computer-readable code therein for sorting respective incident log data from a plurality of machines undergoing diagnostics, the computer-readable code in the article of manufacture comprising:
a computer-readable program code module for receiving incident log data comprising one or more incidents from the plurality of machines and for receiving operational parameter data from the plurality of machines;
a computer-readable program code module for searching in a database of historical repair data for respective repairs executed on the respective machine subsystem;
a computer-readable program code module for executing a set of incident-authentication rules indicative of whether a received incident actually corresponds to a faulty condition or not; and a computer-readable program code module for assigning a predetermined incident severity rating to the respective incidents; and a computer-readable program code module for processing the respective incidents based on their respective incident severity rating.

38. A system for sorting respective incident log data from a plurality of machines undergoing diagnostics, the system comprising:

means for receiving incident log data comprising one or more incidents from the plurality of machines;

means for receiving operational parameter data from the plurality of machines;

means for assigning a predetermined incident severity rating to the respective incidents;

means for executing a set of incident-authentication rules indicative of whether a received incident actually corresponds to a faulty condition or not; and means for processing the respective incidents based on their respective incident severity rating.

39. The system of claim 38 wherein the incident log data and/or operational data is programmed based on a respective configuration of respective ones of the machines.

40. The system of claim 38 wherein each respective one of the incident-authentication rules is triggered upon detection of a respective combination of operational parameters from the machine.

41. The system of claim 38 wherein each respective one of the incident-authentication rules is triggered upon detection of a respective combination of incidents from the machine.

42. The system of claim 38 wherein each respective one of the incident-authentication rules is triggered upon detection of a respective combination of incidents and operational parameters from the machine.

43. The system of claim 38 further comprising a step of disregarding incidents authenticated as corresponding to non-faulty conditions.

44. The system of claim 38 further comprising means for defining an incident count value for each respective incident.

45. The system of claim 44 further comprising means for incrementing the incident count value based on whether an incident-authentication rule is triggered or not.

46. The system of claim 38 wherein the received incident log data comprises incident log data of respective subsystems of the plurality of machines.

47. The system of claim 46 further comprising a an electronic database designating one or more individuals responsible for respective ones of the machine subsystems.

48. The system of claim 47 further comprising a means for electronically notifying the designated individuals of subsystem incidents classified as likely to result in respective road failures.

49. The system of claim 48 further comprising a means for electronically notifying the designated individuals of subsystem incidents classified as undeterminable and/or special interest.

50. A system for sorting respective incident log data from a plurality of machines undergoing diagnostics, the system comprising:

means for receiving incident log data comprising one or more incidents from the plurality of machines;

means for assigning a predetermined incident severity rating to the respective incidents;

means for selectively setting a incident weighing value for each respective incident based on its assigned rating; and means for processing the respective incidents based on their respective incident severity rating.

51. A system for sorting respective incident log data from a plurality of machines undergoing diagnostics, the system comprising:

means for receiving incident log data comprising one or more incidents from the plurality of machines;

means for assigning a predetermined incident severity rating to the respective incidents, wherein the incident severity rating is based on an expected level of machine degradation associated with each respective incident; and means for processing the respective incidents based on their respective incident severity rating.

52. The system of claim 51 wherein the expected level of machine degradation comprises an imminent machine mission failure.

53. The system of claim 51 wherein the expected level of machine degradation is undeterminable.

54. The system of claim 53 further comprising means for executing expert analysis when the expected level of machine degradation is classified as undeterminable.

55. The system of claim 51 wherein the expected level of machine degradation is sufficiently low to enable continuing operation of the machine at least for a predetermined time interval.

56. A system for sorting respective incident log data from a plurality of machines undergoing diagnostics, the system comprising:

means for receiving incident log data comprising one or more incidents from the plurality of machines, wherein the plurality of machines comprises a fleet of locomotives;

means for assigning a predetermined incident severity rating to the respective incidents; and means for processing the respective incidents based on their respective incident severity rating.

57. The system of claim 56 wherein the expected level of machine degradation comprises an imminent road failure.

58. A system for sorting respective incident log data from a plurality of machines undergoing diagnostics, the system comprising:

means for receiving incident log data comprising one or more incidents from the plurality of machines;

means for receiving operational parameter data from the plurality of machines, wherein the operational parameter data comprises snapshot data;

means for assigning a predetermined incident severity rating to the respective incidents; and means for processing the respective incidents based on their respective incident severity rating.

59. A system for sorting respective incident log data from a plurality of machines undergoing diagnostics, the system comprising:

a processor for receiving incident log data comprising one or more incidents from the plurality of machines;

a processor for receiving operational parameter data from the plurality of machines;

a processor for assigning a predetermined incident severity rating to the respective incidents;

a processor for executing a set of incident-authentication rules indicative of whether a received incident actually corresponds to a faulty condition or not; and a processor for processing the respective incidents based on their respective incident severity rating.

60. The system of claim 59 wherein each processor collectively constitutes a single processor.

61. A system for sorting respective incident log data from a plurality of machines undergoing diagnostics, the system comprising:

a processor for receiving incident log data comprising one or more incidents from the plurality of machines;

a processor for assigning a predetermined incident severity rating to the respective incidents;

a processor for selectively setting a incident weighing value for each respective incident based on its assigned rating; and a processor for processing the respective incidents based on their respective incident severity rating.

62. A system for sorting respective incident log data from a plurality of machines undergoing diagnostics, the system comprising:

a processor for receiving incident log data comprising one or more incidents from the plurality of machines;

a processor for assigning a predetermined incident severity rating to the respective incidents, wherein the incident severity rating is based on an expected level of machine degradation associated with each respective incident; and a processor for processing the respective incidents based on their respective incident severity rating.

63. A system for sorting respective incident log data from a plurality of machines undergoing diagnostics, the system comprising:

a processor for receiving incident log data comprising one or more incidents from the plurality of machines;

a processor for receiving operational parameter data from the plurality of machines, wherein the operational parameter data comprises snapshot data;

a processor for assigning a predetermined incident severity rating to the respective incidents; and a processor for processing the respective incidents based on their respective incident severity rating.

64. A system for sorting respective incident log data from a plurality of machines undergoing diagnostics, the system comprising:

a processor for receiving incident log data comprising one or more incidents from the plurality of machines, wherein the plurality of machines comprises a fleet of locomotives;

a processor for assigning a predetermined incident severity rating to the respective incidents; and a processor for processing the respective incidents based on their respective incident severity rating.

65. A method for sorting respective incident log data from am plurality of machines undergoing diagnostics, the method comprising:

receiving incident log data comprising one or more incidents from the plurality of machines;

executing a set of incident-authentication rules indicative of whether a received incident actually corresponds to a faulty condition or not;

assigning a predetermined incident severity rating to the respective incidents; and processing the respective incidents based on their respective incident severity rating.

* * * * *